US005568039A

United States Patent [19]
Fernandez

[11] Patent Number: 5,568,039
[45] Date of Patent: Oct. 22, 1996

[54] APPARATUS AND METHOD OF PROVIDING AN INITIATION VOLTAGE TO A RECHARGEABLE BATTERY SYSTEM

[75] Inventor: Jose M. Fernandez, Lawrenceville, Ga.

[73] Assignee: Motorola, Inc., Schaumburg, Ill.

[21] Appl. No.: 357,891

[22] Filed: Dec. 16, 1994

[51] Int. Cl.$^6$ .................................................. H02J 7/04
[52] U.S. Cl. ............................ 320/29; 320/51; 320/39; 320/35; 429/49
[58] Field of Search ................................. 320/27, 28, 29, 320/39, 40, 5, 13, 30, 35; 429/7, 49

[56] References Cited

U.S. PATENT DOCUMENTS

| | | | |
|---|---|---|---|
| 4,595,872 | 6/1986 | Ball ............................................ | 320/13 |
| 5,304,915 | 4/1994 | Sanpei et al. ............................. | 320/14 |
| 5,493,197 | 2/1996 | Eguchi et al. ............................. | 320/5 |
| 5,518,832 | 5/1996 | Fernandez et al. ....................... | 429/49 |

Primary Examiner—Peter S. Wong
Assistant Examiner—Gregory J. Toatley
Attorney, Agent, or Firm—Frank M. Scutch; Scott M. Garrett; Kenneth M. Massaroni

[57] ABSTRACT

An undervoltage recovery pulse network (500) and method used with a lithium ion battery system (400) for providing a initiation voltage to a battery controller (503) which has been operationally disabled due to an event associated with the lithium ion battery system (400). The undervoltage recovery pulse network (500) includes a switch (523) for detecting a first voltage applied to a data terminal (537) by a charging system. A coupler (525) is used for supplying a second voltage from a charging terminal (535) to the battery controller (503) to enable the battery controller from its disabled state. The battery controller (503) then connects the voltage potential of a cell (501) to the charging terminal (535) for detection by a charging system. This allows the charging system to detect an attached battery so it may apply a charging voltage to charging terminal (535).

24 Claims, 4 Drawing Sheets

APPARATUS AND METHOD OF PROVIDING AN INITIATION VOLTAGE TO A RECHARGEABLE BATTERY SYSTEM

TECHNICAL FIELD

This invention relates in general to battery recharging and more particularly to systems for rechargeable battery cells.

BACKGROUND

An increasing number of portable electronic products are available today which operate on a battery source within the device. These products include such things as cellular telephones, portable radios, pagers and voice recorders which are conveniently mobile and operate using rechargeable batteries. Many different battery chemistries have been used for many years which meet the need for recharging capability. Probably the most popular chemistries include nickel cadmium and nickel metal hydride. A relatively new chemistry, however, generally referred to as lithium ion, enables a cell to be recharged while offering many advantages over other types of rechargeable cells. These benefits primarily are directed to low weight and overall size with a high energy density. One unique factor to be considered when using, a lithium ion cell is its charging scheme. A lithium ion cell is not charged in the same manner as cells utilizing a nickel chemistry.

Nickel-cadmium and nickel metal hydride cells are typically charged using a rapid charge by applying a constant current until a certain event occurs. This event may be coupled to the cell reaching a predetermined high voltage, decreasing to a predetermined low voltage or an increase in the cell's temperature. This is in contrast with the lithium ion cell which requires a two step charging process to achieve optimum performance. The first step of this process provides that the battery charger apply a constant current level while the cell's voltage remains below a predetermined threshold. Once the voltage increases to that threshold, the second step insures the battery charger is held at the threshold voltage allowing the current to decrease. Once the current decreases sufficiently to a desired level, the lithium ion cell is fully recharged.

This two step process presents a problem when considering charging lithium ion cells in a charger designed for nickel systems. Generally, nickel system chargers apply only a constant current which allows the voltage of the cells to rise unimpeded. The voltage may rise to any level provided the battery does not become too hot, i.e. increase to a undesired and dangerous level. Once the nickel system battery becomes hot, the charger detects this state and switches from the rapid high current charge to a value of approximately 5–10% that of the rapid current value. This lower current mode is generally referred to as a trickle current or trickle charge.

Hence, the charging scheme offered by current nickel system chargers will not properly charge a lithium ion cell. Should a lithium ion cell be placed or forced in to the nickel system charger the result could be potentially dangerous since the lithium ion cell could quickly overheat. Therefore, the need exists for a battery charging circuit or system which can be retrofitted to the control circuitry of an existing lithium ion cell allowing the cell to safely use a nickel system charger.

In addition to supplying a retrofitable circuit allowing lithium ion batteries to be recharged using nickel system chargers, a complete battery system would also be useful which would supply additional systems to insure safety when recharging a lithium ion cell in this way.

Still yet another problem associated with utilizing a lithium ion cell with a nickel system charger occurs when circuitry, which is part of the battery system, has disconnected the lithium ion cell from the charging terminals used to charge the cell. The event may occur to due high current or voltage conditions and, due to no operating voltage being available, will leave many of the control and safety systems associated with the battery without power. Thus, no power is present at the charging terminals of the battery.

There are two ways in which a nickel based battery charging system typically detects when to charge an attached battery. These include detection of a thermistor and/or a voltage on the battery. Many charging systems in current use apply a very brief pulse when a data line is detected upon initial connection of the battery to the charging network. Although this pulse is enough to enable or wake up the battery controller, this remains ineffective. Therefore, one method which has been used to provide a start-up or initiation voltage to the internal system to restore voltage to the charging contacts is so called the "double insertion method." This involves actually disconnecting the battery from the charging system once inserted and then reconnecting it at second time. The battery must be reconnected twice since by the time the battery controller is actuated, and the battery controller allows the cell voltage to be applied to the charging contacts, the charger system has already made a determination that no battery is connected. Hence, the battery remains connected to the charging system without any annunciation by the charging system, the consumer understands this to mean that the battery is dead when in fact it is merely disabled. However, once the battery is disconnected and then reconnected, the charger recognizes a voltage potential on the charging terminals since the battery controller was restarted with the first voltage or pulse.

The "double insertion method" is burdensome and confusing requiring connection and reconnection of a disabled battery before recharging can begin. Therefore, the need exists to provide a device and method which allows a charging system to enable a battery controller within a disabled lithium ion battery without the inconvenience of having to connect, disconnect and reconnect the battery to the charging system.

DETAILED DESCRIPTION OF THE PREFERRED EMBODIMENT

Figure 1:
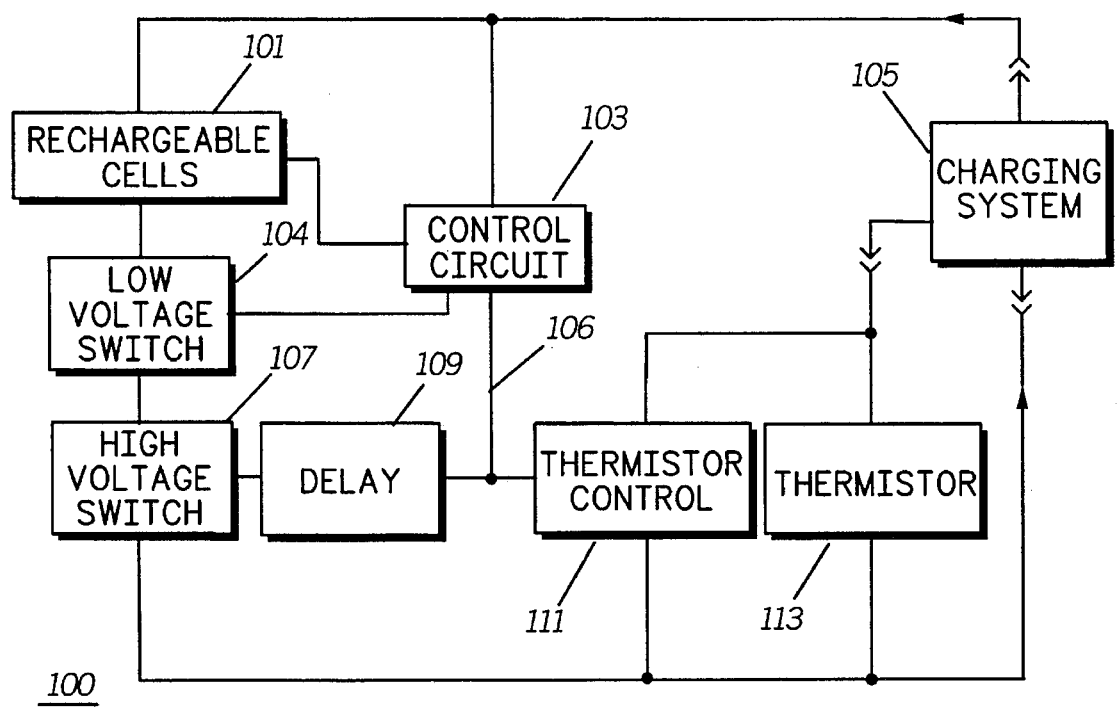
FIG. 1 is a block diagram showing operation of the high temperature simulator in accordance with the invention.

Referring now to FIG. 1, a block diagram depicting operation of a high temperature simulator for a rechargeable battery system which can simulate a high battery temperature condition is shown. The rechargeable battery may typically be one based on a lithium ion chemistry, lithium polymer chemistry or lead acid chemistry. The high temperature simulator allows a rechargeable battery to be charged using an alien charging system or charging network which generally has an incompatible charging scheme. An alien charging system may be one used with a nickel cadmium or nickel metal hydride type cells and has a first mode of operation and second mode of operation. The first mode of operation is generally a quick or fast mode while the second mode is a slower or trickle charge mode. These charging systems are generally referred to as nickel system battery chargers and are configured to charge nickel metal hydride or nickel cadmium cells.

As will be described in greater detail below, the preferred embodiment of the invention takes advantage of an inherent feature present with a nickel system battery charger. This feature insures that rapid charging of a rechargeable battery ceases when the appropriate control information is received from the battery. This control information is related to the battery's temperature during rapid charge. When the predetermined temperature is reached, the nickel system battery charger automatically switches to a low current or trickle charge state where the rechargeable battery can be charged more slowly.

A preferred embodiment of the invention shows battery 100 which includes a rechargeable cell 101. As indicated above, rechargeable cell 101 may be one or more cells with a lithium ion chemistry or the like. A control circuit 103 measures or observes the voltage of the rechargeable cell 101 while under charge by charging system 105. Charging system 105 is typically a charger used for nickel cadmium or nickel metal hydride cells. Control circuit 103 may be a comparator circuit or the like such as Motorola Integrated Circuit Model No. SC371013F/FER. Once control circuit 103 determines a predetermined voltage level or voltage potential has been reached, control circuit 103 produces a control signal on control line 106. The predetermined voltage is generally a selected voltage limit which is determined by the operational voltage of the rechargeable cell 101 and may depend on specific cell chemistry and/or associated charging algorithm.

The control line 106 is used to convey the control signal from control circuit 103 to each of low voltage switch 104, high voltage switch 107 and a temperature simulator device such as thermistor switch 111. Low voltage switch is used to disconnect rechargeable cell 101 in the event its voltage becomes too low, and thereby preventing damage to the cell. High voltage switch 107 and a delay circuit 109 are positioned in series with charging system 105 and are used to provide an open circuit after a desired delay period when a predetermined voltage is reached during charging. The delay period is used to allow charging system 105 to react to changes in current through temperature sensor or thermistor 113. Without the delay, charging system 105 may interpret the opening of high voltage switch 107 as rechargeable cell 101 being disconnected. Once this occurs, charging system 105 may turn itself off.

Thermistor switch 111 is attached to control circuit 103 and is also triggered by the control signal through control line 106 to provide a short circuit to thermistor 113. As is well known in the art, the resistive value or state of thermistor 113 changes in response to temperature changes of rechargeable cell 101. Thus, the current flowing through thermistor 113 changes in relation to the ambient environment in which thermistor 113 is exposed. This current flow is interpreted by the charging system 105 as a temperature value which it uses to determine when to switch charging modes. These modes are typically switched from a fast or rapid charge state, where charging rate is at a high level to a slower charge state where the charging rate is reduced. Thermistor switch 111 is attached to thermistor 113 and is controlled by control circuit 103. When actuated, thermistor switch 111 alters the current flow or state of thermistor 113. As indicated above, this increase in current through thermistor 113 is detected by charging system 105 as a high temperature condition. Thus, thermistor switch 111 acts as a control circuit to change the operational state of thermistor 113. Thermistor switch 111 then simulates a high temperature state of rechargeable cell 101. In response thereto, charging system 105 switches from a high rapid or substantially fast charge mode to a slow, low or trickle charge mode. Since rechargeable cell 101 was first allowed to charge to its predetermined voltage i.e. the first step of its charging scheme, the trickle charge mode now allows rechargeable cell 101 to be charged in accordance with the second step of its charging scheme. Once charging system 105 has switched to the lower current, the voltages of rechargeable cell 101 will drop slightly from their previous level due to internal resistance present within rechargeable cell 101. This lower level of current allows continued charging of the rechargeable cell while its voltage is below the threshold voltage level, until the cell becomes fully charged. However, charging using charging system 105 will generally take longer than if the ideal lithium ion charging regime were used.

Figure 2:
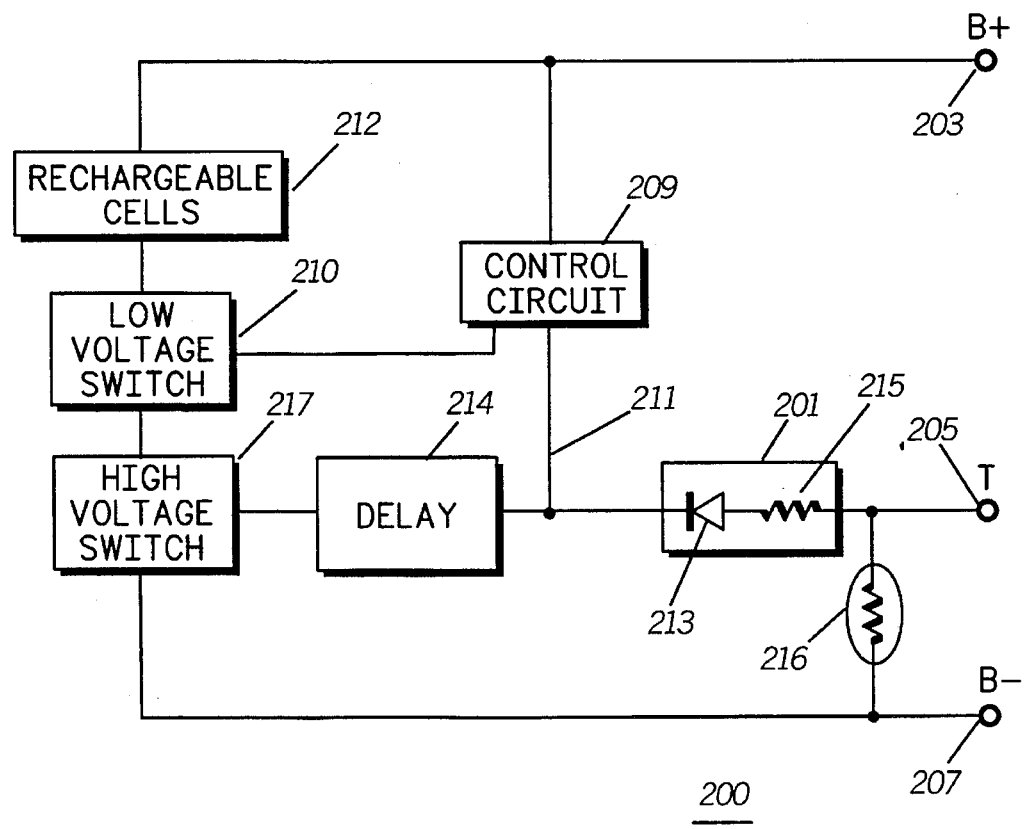
FIG. 2 is a partial schematic diagram in accordance with a preferred embodiment of the invention showing a high temperature simulator which is used when a high current source is available.

FIG. 2 illustrates a schematic representation of the high temperature simulator circuit 201 typically used in a rechargeable battery 200 where control circuit 209 can sink sufficient current to an isolated or virtual ground. As is seen in FIG. 2, rechargeable battery 200 typically includes a charging voltage node 203, a temperature node 205 and a virtual ground node 207. In operation, a charging voltage is connected to the charging voltage node 203 and virtual ground node 207. A battery charging system (not shown) measures temperature through temperature node 205 to determine when to change or switch operating modes. The battery charging system may be one designed for nickel cadmium cells, nickel metal hydride cells or the like. As indicated above, low voltage switch 210 is used to prevent rechargeable cells 211 from discharging below a selected value. Conversely, when control circuit 209 detects that rechargeable cell 212 has reached a predetermined high voltage during charging, it sends a control signal through control line 211 to high temperature simulator circuit 201 and high voltage switch 217 through delay 214. High temperature simulator circuit 201 is comprised of a diode 213 and resistor 215. When the control signal enables high temperature simulator circuit 201 and high voltage switch 217, it switches the voltage at temperature node 205 from a high level to virtual ground node 207. This has the affect of pulling or lowering the voltage on temperature node 205 to a low value since current is being sunk to virtual ground node 207. Thus, this lower voltage simulates a high temperature condition of thermistor 216. This is detected by the battery charging system on temperature node 205 as high temperature condition which enables it to switch modes. Although diode 213 could be used alone, resistor 215 is used to insure the voltage on temperature node 205 is not dropped to too low a value since certain varieties of battery chargers enter a test mode under these conditions.

Figure 3:
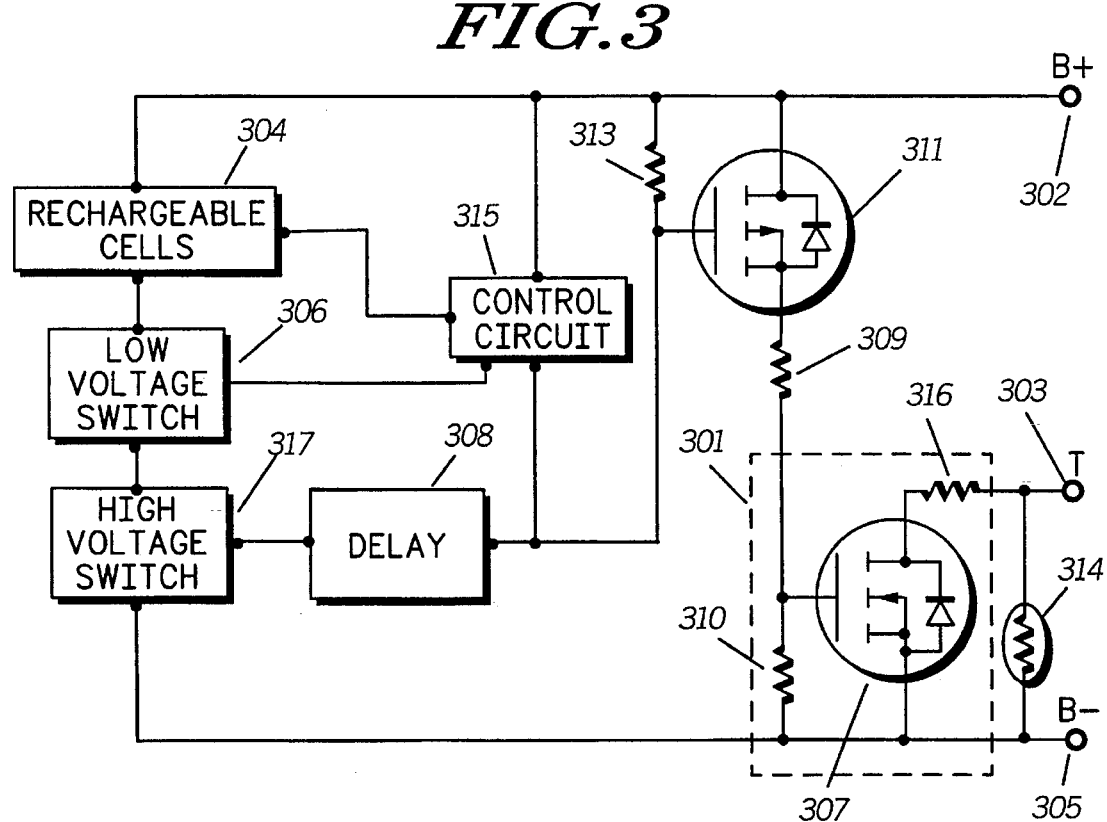
FIG. 3 is a partial schematic diagram in accordance with a preferred embodiment of the invention showing a high temperature simulator which is used when only a low current source is available.

FIG. 3 illustrates a schematic representation of the high temperature simulator circuit 301 typically used in a rechargeable battery 300 such as a lithium ion battery. High temperature simulator circuit 301 is used where control circuit 315 cannot sink a significant amount current to allow the circuit shown in FIG. 2 to be used. It should be evident to those skilled in the art the function and operation of the rechargeable cells 304, low voltage switch 306 and delay 308 are like that described in FIGS. 1 and 2 above. Rechargeable battery 300 utilizes a charging node 302, temperature node 303 and virtual ground node 305. The high temperature simulator circuit 301 is comprised of an N-channel MOSFET 307, resistor 309, resistor 310, P-channel MOSFET 311 and resistor 313. In operation, when control circuit 315 actuates high voltage switch 317, this biases the gate-source junction of P-channel MOSFET 311. Resistor 313 is used to pull up or increase the voltage on the gate of N-channel MOSFET 307 if control circuit 315 should fail. Resistor 313 is of a sufficiently high resistance to allow only a negligible current flow through it from charging node 302 when a control signal is enabled from control circuit 315. This causes P-channel MOSFET 311 to become a low resistance value and current flows through P-channel MOSFET 311, resistor 309 and resistor 310. The resulting voltage produced also biases N-channel MOSFET 307 into a low resistance state switching it to an on state. Once N-channel MOSFET 307 is switched on, resistor 316 acts to drop voltage on temperature node 303 sufficiently to indicate or simulate to a battery charging system (not shown) that a high temperature condition exists. The voltage at temperature node 303 is dropped low since the current passing through this node is directed or sunk to virtual ground node 305. Thus, the voltage measured across thermistor 314 is simulated using high temperature simulator circuit 301. The configuration shown in FIG. 3 may only be used if control circuit 315 cannot handle excessive current it must sink from an attached charging system. The circuit shown in FIG. 3 is more complex however it has the advantage of low current since only a negligible amount of current flow through resistor 313 when a control signal is enabled from control circuit 315.

Figure 4:
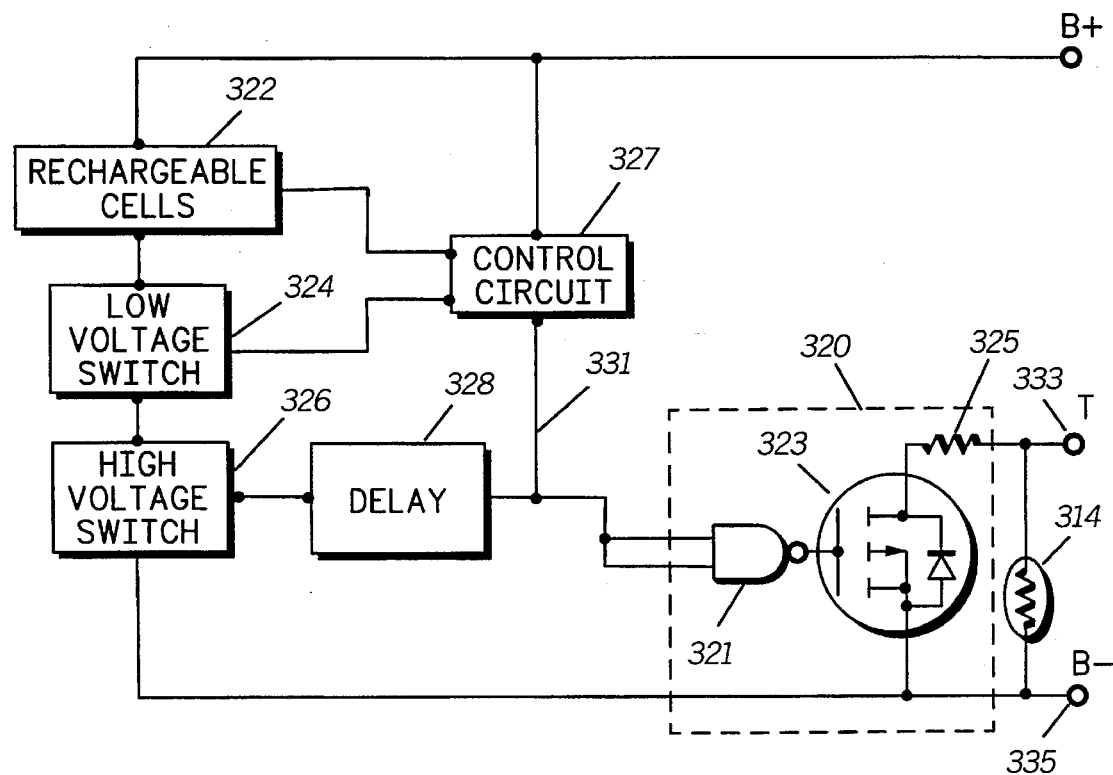
FIG. 4 is a partial schematic diagram in accordance with a preferred embodiment of the invention showing an alternative embodiment of a high temperature simulator to that shown in FIG. 2.

FIG. 4 illustrates a schematic representation of a high temperature simulator circuit 320. High temperature simulator circuit 320 is an alternative embodiment to that shown in FIG. 2 where a high current source from an attached charging system is available. It should be evident to those skilled in the art the function and operation of the rechargeable cells 322, low voltage switch 324, high voltage switch 326 and delay 328 are like that described in FIGS. 1, 2 and 3 above. In the preferred embodiment, high temperature simulator circuit 320 includes an inverter gate 321, P-channel MOSFET 323 and resister 325. In operation, like the other embodiments above, when control circuit 327 detects a high voltage condition in cells 329, a control signal is emitted on control line 331. This pulls or lowers the voltage on control line 331 to a low state which also controls the input of inverter gate 321 low. This biases P-channel MOSFET 323 turning it on. When P-channel MOSFET is turned on this pulls or lowers the temperature node 333 to a low state since temperature node 333 is effectively connected to virtual ground node 335. The value of resister 325 is used to control and/or select the desired temperature level that is interpreted by an attached battery charging system. Thus, an attached battery charging system which is connected to temperature node 333 detects a high temperature in view of the low voltage on this node. High temperature simulator circuit 320 acts to simulate or create a false high temperature condition.

The preferred method of practicing the invention includes charging a rechargeable battery with a charging apparatus having a first mode of operation and second mode of operation whose charging scheme is incompatible with the rechargeable cell within said rechargeable battery. The steps include applying a charging current from the charging apparatus to the rechargeable cell. Detecting a voltage potential of the rechargeable cell. Measuring the temperature of the rechargeable cell using a temperature sensor and sending a control signal from a first control network to a second control network when a predetermined voltage potential is reached to allow the temperature sensor to simulate a high temperature to the charging apparatus. Finally, sensing a simulated high temperature of the charging apparatus to change from said first mode of operation to the second mode of operation allowing the rechargeable cell to charge at a slower rate.

Thus, hot battery simulator apparatus and method disclosed will enable a new generation of lithium cell chemistries to be used without the burden of the consumer having to purchase a special charger to accommodate and recharge these rechargeable cells such as lithium ion cells. This will more greatly enhance the benefits and advantages of utilizing lithium based cells keeping overall cost low as opposed to buying a completely new charger and batteries for any desired application.

Figure 5:
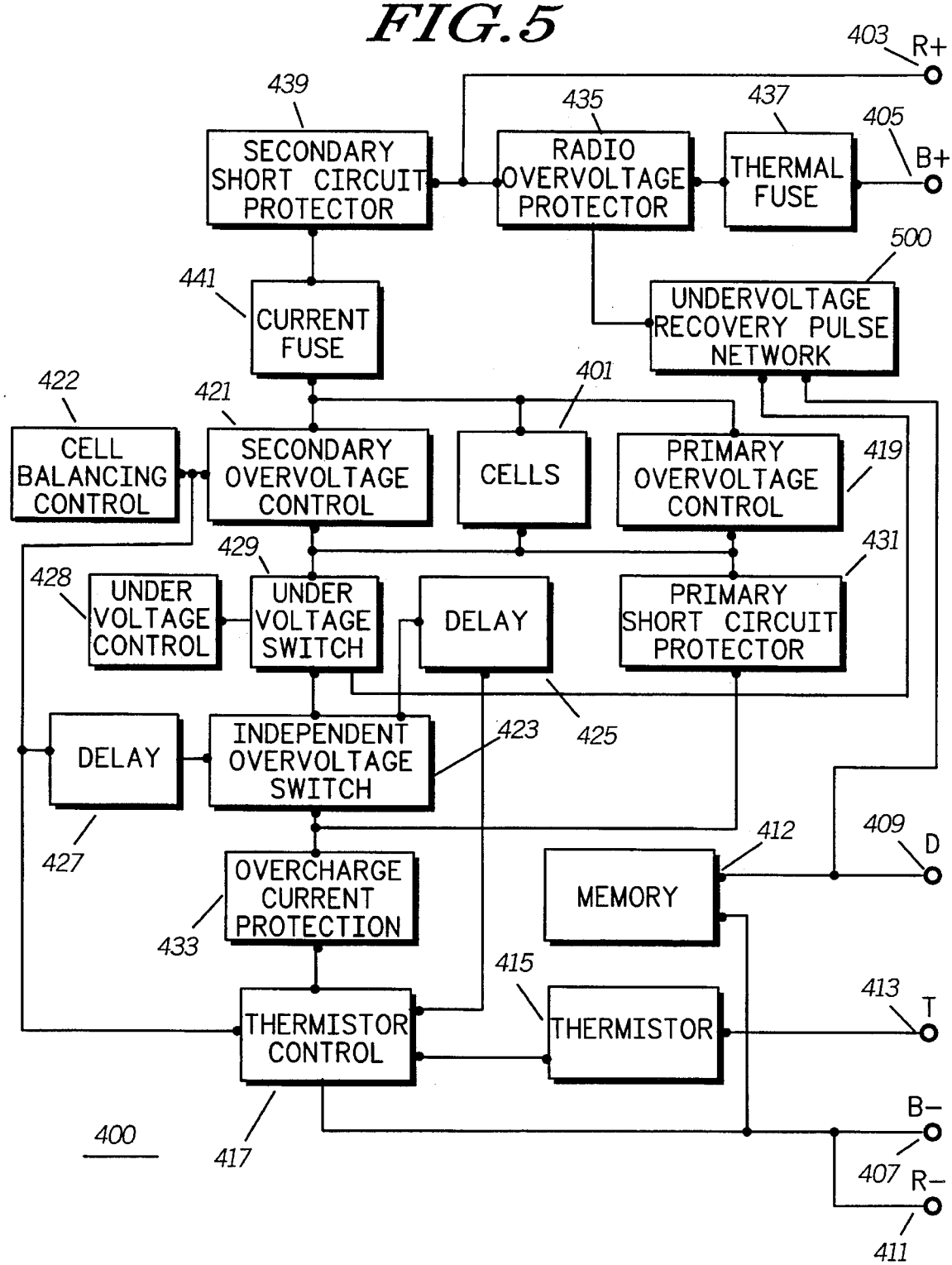
FIG. 5 is a block diagram showing operation of a retrofitable charging and safety system used with a lithium ion cell in accordance with the invention.

FIG. 5 shows a block diagram of a lithium ion battery safety and control circuit platform or battery system 400. This system has been developed for use in future lithium ion batteries, as well as a retrofit for batteries currently in use. The system is intended to accommodate various user and manufacture recommendations for providing a useful and safe rechargeable battery system that can be charged with an existing charger designed only for nickel battery systems.

The battery system 400 for use with a portable electronic device includes protection circuitry for one of more cells 401. Cells 401 are generally lithium ion or the like and provide a voltage potential at operating terminals 403 and 411. Operating terminals 403, 411 are used to supply an operating voltage to a portable product (not shown) which uses battery system 400 for a power source. The system further includes charging terminals 405, 407 which are used to receive a charging voltage which is applied to recharge cells 401. A data terminal 409 supplies information to a charging system from a memory 412. Memory 412 is a ROM type memory or the like and conveys information to those types of chargers known as "smart chargers". This information is relating to the battery type and charging regime which a charging system would be require to know before recharging the battery. Finally, a temperature terminal 413 is used to allow the charging system to detect the temperature of the battery during recharging. This is accomplished through the use of a thermistor 415 or like device which permits measurement by the charging system of an accurate battery temperature during the recharging process. A thermistor control 417 is attached to thermistor 415 and is controlled by primary overvoltage control 419 and secondary overvoltage control circuit 421 to change or redirect the current flow around thermistor 415. Thermistor control 417 is discussed in more detail above and has the effect of simulating a high temperature condition of cells 401. This is subsequently detected by an attached charging system (not shown) allowing it alter its charging mode of operation from a fast charge to a slower or trickle charge.

Primary overvoltage control 419 is connected with cells 401 and is used to measure the cumulative voltage present on the cells 401 to prevent the cells from increasing or rising above a selected voltage. In the event primary overvoltage control 419 fails or becomes inoperative, secondary overvoltage control 421 is used to measure the voltage on each individual cell and prevent each individual cell from increasing or rising above a selected voltage. Upon actuation of either primary overvoltage control 419 or secondary overvoltage control 421, a control signal is supplied to one or more independent overvoltage switches 423. Actuation of any one of independent overvoltage switches 423 provides an open circuit which disconnects cells 401 from operating terminals 403, 411. Each control signal is delayed using a delay 425 or delay 427 respectively which delays the control signal before actuating any of independent overvoltage switches 423. The delay 425, 427 is used to insure thermistor control 417 receives its control signal before independent overvoltage switches 423 are enabled which would disconnect the charge current from cells 401. This allows an attached charging system to detect simulated changes in the temperature of cells 401 and alter its mode of operation before actuating any of independent overvoltage switches 423. Similarly, undervoltage control 428 is used to measure the cumulative voltage of the cells 401 and provides a control signal to undervoltage switch 429 when the cumulative voltage drops below a predetermined level. Like independent overvoltage switches 423, undervoltage switch 429 is connected serially with cells 401 and disconnects cells 401 when the voltage of the cells drops to an undesirably low level to prevent damage to cells 401.

Cell balancing control 422 is comprised a load (not shown) connected in parallel with each of cells 401. Cell balancing control 422 acts to switch the load across a cell in order to maintain each of the cells at approximately the same voltage level during charging. The load is used to slightly discharge a single cell in the event the cell becomes a slightly higher voltage as compared with other cells. The load is disconnected once the cell voltage has been reduced to a level compatible with other cells.

Primary short circuit protector 431 is used to measure the voltage across both independent overvoltage switches 423 and undervoltage switch 429. Since these switches inherently have a stable DC resistance, the voltage across them is proportion to the current which runs through them when cells 401 are being recharged. When the current through independent overvoltage switches 423 and undervoltage switch 429 reaches a predetermined, i.e., excessive level, this also drops the voltage across these switches. In response to a selected voltage drop across independent overvoltage switches 423 and undervoltage switch 429, primary short circuit protector 431 provides a control signal to undervoltage switch 429. This insures the undervoltage switch 429 disconnects cells 401 from terminals 403–411 to prevents any further discharge until the excessive high current conditions removed. This acts as a safety feature to prevent cells 401 from generating excessive heat and possible damage under extremely high load conditions.

Overcharge current protector 433 is a complement to primary short circuit protector 431 by directly measuring the amount of current through it. If the current reaches a selected level, a control signal is generated by overcharge current protector 433 to independent overvoltage switches 423 which disconnects cells 401 from terminals 403–411. Additionally, overcharge current protector 433 is used to limit the charge current. Since cells 401 is a lithium ion type cell and is used with a charger designed with a charging regimen for nickel chemistry cells, it often may charge at a current level higher than at the optimum level for a lithium ion cell. In this case, overcharge current protector 433 will detect this high current level and provide a control signal to thermistor control 417 to simulate a high temperature condition. This tricks the nickel system charger and forces it into a low current or trickle charge mode which is more suited for the lithium ion cell.

Electronic device overvoltage protector 435 is connected serially with cells 401 and charging terminal 405 and is used to determine when any of independent overvoltage switches 423 have been actuated. Since actuation of these switches may cause the voltage of cells 401 to increase or rise to a level which could damage electronic equipment attached to the battery system 400 at operating; terminals 403, 411 electronic device overvoltage protector 435 detects actuation of independent overvoltage switches 423 and in response thereto, disconnects operating terminal 403, from charging terminal 405 to prevent an attached charger from supplying a potentially damaging voltage to an electronic device attached to operating terminal 403. Alternatively, if electronic device overvoltage protector 435 is not used, a thermal fuse 437 can be implemented. Thermal fuse 437 is also attached serially between cells 401 and charging terminal 405 and is generally a high power zener diode (not shown) or the like. The zener diode acts to shunt current when cells 401 are above a selected voltage since this would likey damage an electronic device attached to operating terminal 403.

A secondary short circuit protector 439 acts as a current detection element and is also connected in series between cells 401 and operating terminal 403 and charging terminal 405. Secondary short circuit protector 439 may be a polyswitch or the like and is used to detect excessive current which may not be detected by either primary short circuit protector 431 or overcharge current protector 433.

Finally, a current fuse 441 also acts as a current detection element and is placed in series between cells 401 and operating terminal 403 and charging terminal 405 and is used as a last resort or ultimate backup in the event of a catastrophic failure in which current rises to an unacceptable level. The fuse is generally located close to cells 401 to minimize runner length. The current fuse 441 is preferably a slow acting type so as not to interfere with other current protection systems with lithium ion battery system 400.

Finally, undervoltage recovery pulse network 500 is used in the event that any one of independent overvoltage switches 423 have been actuated and cells 401 are no longer connected to charging terminal 405. Under these conditions, when the battery is initially connected to a charging system (not shown), the charging system first detects a voltage present on charging terminals 405, 407. If no voltage is present, the charging system determines that no battery is connected to it and does not provide a charging voltage to operating terminals 403, 411. When the battery is initially connected however, an initial pulse of a predetermined voltage and amplitude is supplied from the charging system to data terminal 409. This pulse is detected by undervoltage recovery pulse network 500 which utilizes the voltage to restore operation of independent overvoltage switches 423. Once operation of independent overvoltage switches 423 is restored, the appropriate switch is closed which restores continuity between cells 401 and charging terminal 405 through electronic device overvoltage protractor 435. Thus, the voltage of cells 401 is restored in a time fast enough that a charging system will detect this voltage on operating terminals 403, 411 even when a battery system 400 is disabled, and cells 401 disconnected due to some event which has occurred. The charging system will recognize the voltage on charging terminals 405, 407 and begin a charging cycle by applying a charging voltage to these terminals.

Figure 6:
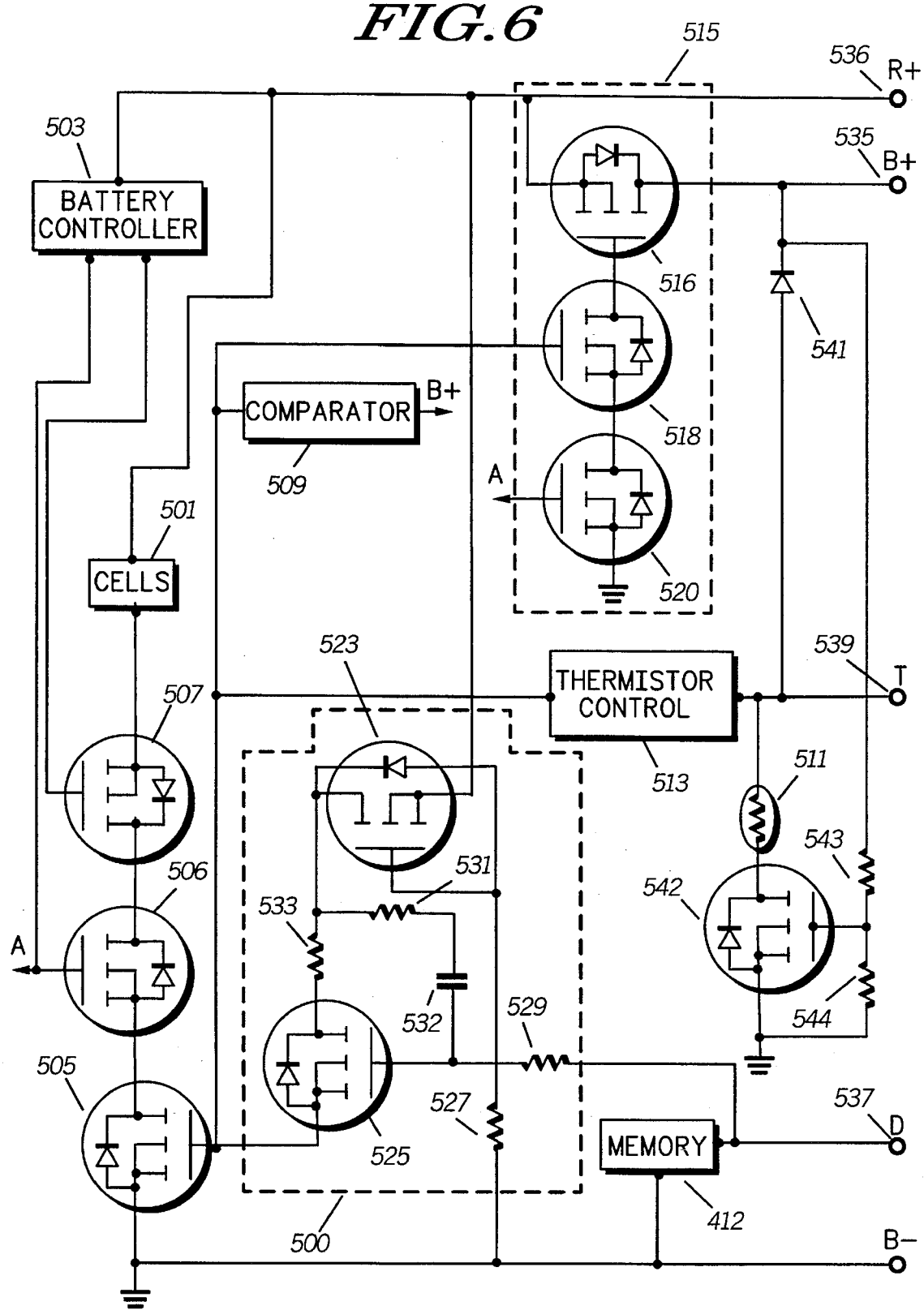
FIG. 6 is a partial schematic diagram showing an undervoltage recovery pulse network in accordance with the preferred embodiment of the invention.

FIG. 6 shows a schematic diagram of the undervoltage recovery pulse network 500 as used in a typical lithium ion rechargeable battery system. As noted in FIG. 5 the system includes among other things, a plurality of cells 501, a battery controller 503, overvoltage switches 505, undervoltage switch 507, comparator 509, thermistor 511 and thermistor control 513. A electronic device overvoltage protector 515 is comprised of transistors 516, 518 and 520 for monitoring the state of said overvoltage switches 505 to prevent an electronic device attached to cells 501 from being damaged.

The undervoltage recovery pulse network 500 is comprised of transistors 523 and 525 along with resistors 527, 529, 531, 533 and capacitor 532. Assuming the battery has experienced and event in which either primary overvoltage switch 505 or secondary overvoltage switch 506 are actuated or undervoltage switch 507 has been actuated, Cells 501 are no longer connected to charging terminals 535. If a battery, including cells 501, were connected to a charging network, no voltage would be detected by the charging network to start a charging cycle.

In order to prevent this undervoltage recover pulse network 500 acts in the following manner. When the portable battery is initially attached to a charging network, a low level voltage or pulse is generally applied to either data terminal 537 or thermistor terminal 539 if the charging network is so equipped. Since thermistor terminal 539 is connected to charging terminal 535 through diode 541, a small voltage is typically already present on charging terminal 535. Assuming the voltage is present on data terminal 537, it is directed to a voltage divider comprised of resistors 529, 531. This results in transistor 523 and transistor 525 being switched on which supplies the voltage from electronic device terminal 536 to charging terminal 535. At some later time, the charging network applies a detection pulse to charging terminal 535 in order to detect a voltage potential of a connected cell. The detection pulse enables a current to pass from charging terminal 535 to electronic device terminal 536 through transistor 523 which passes through cells 501. This has the result of enabling the comparator 509 which turns on primary overvoltage switch 505 comprised of a transistor. Thus, transistor 523 provides a temporary bypass for electronic device overvoltage protector 515 for allowing a start up pulse or initiating voltage to reactivate the battery controller 503. Electronic device overvoltage protector 515 includes a transistor 516 which couples or bypasses a charging voltage on charging terminal 535 through transistor 518 and transistor 520 to secondary overvoltage switch 506 and battery controller 503. This occurs even when cells 501 are not connected to charging terminals 535. Once battery controller 503 is reactivated, transistor 542 is turned on by a voltage divider comprised of resistor 543, 544 when voltage reaches approximately 3.0 volts. This allows normal operation of thermistor 511. Transistor 523 is an N-channel MOSFET and switches to an off state when the voltage at electronic device terminal 536 reaches a voltage greater than on data terminal 537 i.e. approximately 5.0 volts. Resister 531 and capacitor 532 provide a pulse coupled path for those charges which do not have data terminal 537 but do provide some type of output pulse such a charge output capacitance. Once the voltage is detected on charging terminal 535, all other battery systems beginning normal operation.

While the preferred embodiments of the invention have been illustrated and described, it will be dear that the invention is not so limited. Numerous modifications, changes, variations, substitutions and equivalents will occur to those skilled in the art without departing from the spirit and scope of the present invention as defined by the appended claims.

What is claimed is:

1. A device used with a rechargeable battery for providing a initiation voltage to a battery controller which has been operationally disabled due to an event associated with said rechargeable battery, said rechargeable battery charged by a charging system and including at least one cell, a charging terminal for supplying a charging current to said rechargeable battery and a data terminal for supplying information to said charging system, said device comprising:

at least one switch for detecting a first voltage applied to said data terminal by said charging system;

a coupling means for supplying a second voltage from said charging terminal to said battery controller to enable said battery controller; and wherein a battery controller directs said voltage potential of said at least one cell to said charging terminal for detection by said charging system.

2. A device as in claim 1 wherein said data terminal is used to send charging information to said charging system.

3. A device as in claim 1 wherein said data terminal is used to send temperature information to said charging system.

4. A device as in claim 1 wherein said at least one cell is a lithium ion cell.

5. A device as in claim 1 wherein said charging terminal supplies a charging voltage from said charging system to said at least one cell.

6. A device as in claim 1 wherein said coupling means is comprised of a plurality of transistors.

7. A method of enabling a battery controller which has been disabled due to a safety control system associated with a portable battery, said portable battery including a charging node for supplying a charging current to at least one cell within said portable battery and a data node for conveying information to a charging system, comprising the steps of:

attaching said portable battery to said charging system;

detecting a first voltage provided at said data node by said charging system;

actuating a first switch with said first voltage from said data node;

enabling said battery controller with a second voltage provided by said charging system through said charging node; and connecting said at least one cell to said charging node for detection by said charging system.

8. A method as in claim 7 wherein said enabling step further comprises the step of:

actuating a second switch with said battery controller which connects said at least one cell with said charging node.

9. A method as in claim 7 wherein said information is charging information relating to said at least one cell.

10. A method as in claim 7 wherein said information is temperature information relating to said at least one cell.

11. An undervoltage pulse generator circuit for allowing a battery controller which controls at least one switch establishing continuity between a battery cell and a charging terminal to be reactivated by a battery charger when it has been temporarily disabled due to an event associated with said battery cell, said undervoltage pulse generator circuit comprising:

a first switch for receiving a pulse provided by a data terminal on said battery charger and connecting a charging terminal to a electronic device supply terminal in response thereto;

a second switch connected to said first switch and said battery controller for providing a path for a current applied to said charging terminal by said battery charger to said battery controller; and wherein said battery controller is reactivated by said current applied to said charging terminal reestablishing continuity between said battery cell and said charging terminal for detection by said battery charger.

12. An undervoltage pulse generator circuit as in claim 11 wherein said battery cell has a lithium ion chemistry.

13. An undervoltage pulse generator circuit as in claim 11 wherein said battery charger is used for nickel metal hydride cells.

14. An undervoltage pulse generator circuit as in claim 11 wherein said first switch is an N-channel MOSFET.

15. An undervoltage pulse generator circuit as in claim 11 wherein said second switch is an N-channel MOSFET.

16. An undervoltage pulse generator circuit as in claim 11 wherein said data terminal is used to convey charging information to said battery charger.

17. An undervoltage pulse generator circuit as in claim 11 wherein said data terminal is used to convey temperature information of said battery cell to said battery charger.

18. A method of enabling a control system used with a portable battery which has been inactivated by a control switch on the portable battery comprising the steps of:

receiving a pulse at a first node on said portable battery used to convey data to a battery charging system;

activating a bypass switch with said pulse to connect a voltage supplied at a second node of said portable battery, by said battery charging system, to reactivate said control system; and opening said control switch to connect said portable battery to said second node for detection by said battery charging system.

19. A method of enabling a control system as in claim 18 wherein said battery is a lithium ion battery.

20. A method of enabling a control system as in claim 18 wherein said first node is used to convey charging information from said portable battery to said charging system.

21. A method of enabling a control system as in claim as in claim 20 wherein said second node is used to supply a charging voltage to said portable battery.

22. A method of enabling a control system as in claim 18 wherein said first node is used to convey temperature information from said portable battery to said charging system.

23. A method of enabling a control system as in claim 18 wherein said second node is used to supply a charging current to said portable battery.

24. A method of enabling a control system as in claim 18 wherein said bypass switch includes at least one transistor connected serially with said portable battery and said second node.

* * * * *